O. D. APPLE.
GAS CONTROLLING APPARATUS FOR BATTERY CELLS.
APPLICATION FILED FEB. 13, 1908.
932,087. Patented Aug. 24, 1909.
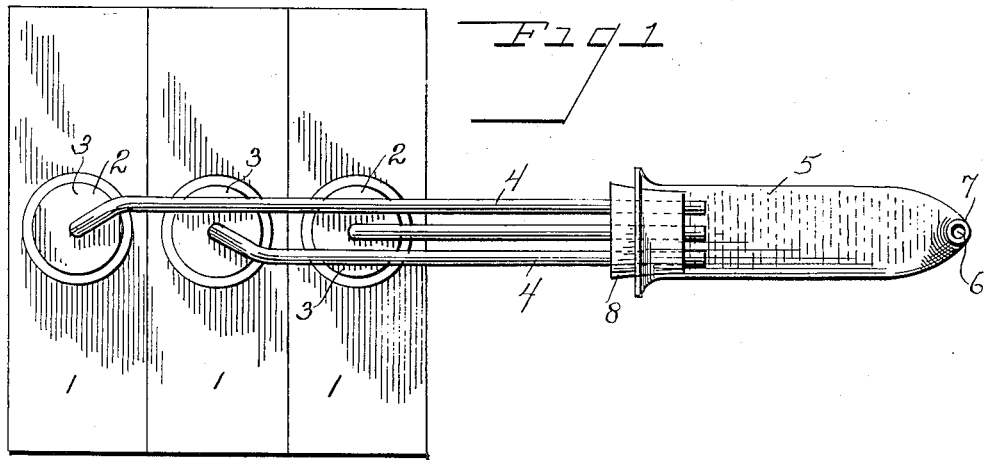
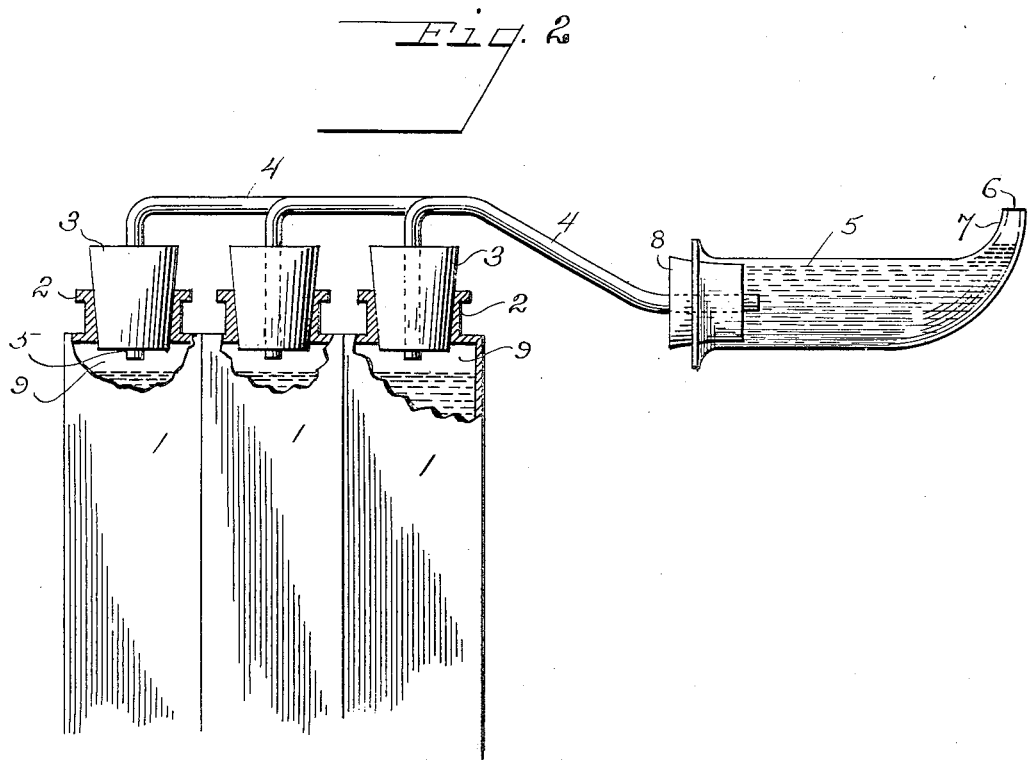
WITNESSES:
INVENTOR.
Oscar D. Apple
BY
J. Lewellyn Walker
ATTORNEY.

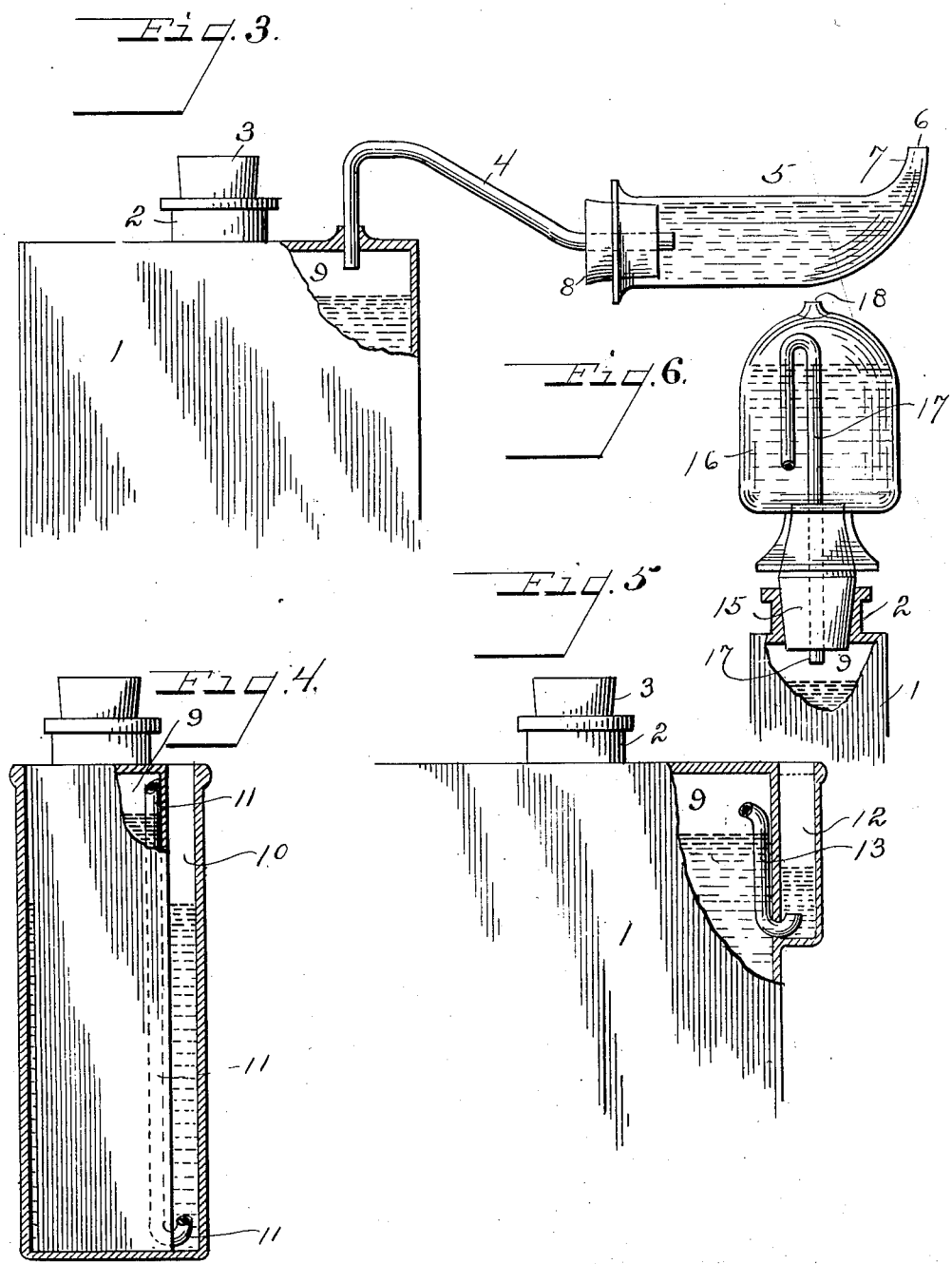

UNITED STATES PATENT OFFICE.

OSCAR D. APPLE, OF MIAMISBURG, OHIO.

GAS-CONTROLLING APPARATUS FOR BATTERY-CELLS.

932,087.

Specification of Letters Patent. Patented Aug. 24, 1909.

Application filed February 13, 1908. Serial No. 415,734.

*To all whom it may concern:*

Be it known that I, OSCAR D. APPLE, a citizen of the United States, residing at Miamisburg, in the county of Montgomery and State of Ohio, have invented certain new and useful Improvements in Gas-Controlling Apparatus for Battery-Cells, of which the following is a specification.

My invention relates to electric batteries, and particularly to a means for controlling the escape of oxygen and hydrogen gases generated in the cells of batteries.

The invention is applicable to both primary and secondary batteries, both portable and stationary.

In the operation of storage batteries using either alkaline or acid electrolytes oxygen and hydrogen gases are generated in considerable quantities at all times, the generation of the gas being greater during charging and particularly toward the end of the operation, when in case of over charging the generation of gas becomes very violent. The gases forming in the electrolyte within the cell and arising therefrom become saturated, or charged with the particles of electrolyte, which if the gases are allowed to escape in the ordinary manner is deposited as a fine spray in the atmosphere about the battery, and upon neighboring articles. The escaping gases so charged with electrolyte are very irritating to the membrane of the nose and throat producing coughing, and other inconvenience. A further serious objection to the free escape of the gases so charged with electrolyte is that they deposit the alkaline or acid solution upon the cells and other adjacent surfaces, producing oxidation and corrosion of metals in the case of acid electrolyte and resulting in the softening, decomposition, and other injury to adjacent wood work when the electrolyte is alkaline, in both cases increasing the liability of current leakage.

The object of the invention is to greatly simplify the construction as well as the means and mode of operation of controlling devices for said gas, whereby said devices will be cheapened in construction, more efficient and positive in operation, and unlikely to get out of repair.

Further objects are to provide means for preventing dirt or dust entering the cell, to protect the electrolyte within the cell against the air or atmosphere, thereby preventing undue evaporation of the electrolyte, to provide a cooling medium through which the gas must pass, thus reducing its explosive tendencies, and to provide a fire stop whereby in case the escaping gas should take fire it will be effectually prevented from flashing back and igniting the gas within the cell.

Further objects are to provide means of cleansing the gas of its corrosive properties, and to collect and prevent the loss of the particles of electrolyte carried by the gas, and also any overflow of electrolyte due to too rapid charging or over charging, thus preventing the undue depletion of the solution within the cell. The controller is also designed to indicate the condition of the cell, whether fully charged or otherwise, and to form a reservoir for filling the cells either by gravity or by air pressure.

With the above primary and other incidental objects in view as will appear from the specification, the invention consists of the means, parts, construction, and combination and operation thereof, or their equivalent hereinafter described and set forth in the claims.

The fundamental principles of the gas control are capable of being embodied in constructions of various forms, several of which are shown in the accompanying drawings, in which—

Figure 1 is a plan view of an embodiment of the invention applied to a series of three battery cells. Fig. 2 is a side elevation of same. Fig. 3 illustrates a similar construction showing a different point of attachment to the cell. Figs. 4, 5 and 6 illustrate different applications or modifications of the invention.

Like parts are indicated by similar characters of reference through out the several views.

In the drawings 1 represents the cells of a battery of usual construction which may be of any suitable shape, material, or detail construction. The cell is provided with the usual orifice, preferably surrounded by a neck or flange 2, and having a stopper 3 adapted to close said orifice.

A conduit 4 of glass, rubber or other acid and alkali proof material extends from a point above the normal fluid level of the electrolyte solution within the cell 1 through the stopper 3 and discharges below the fluid level of a reservoir 5 containing a gas cleansing fluid. The particular shape of the reservoir 5 is not considered essential, but one of the preferable forms is shown in Figs. 1, 2 and 3, and comprises a tubular body of glass or other transparent material having a gas vent 6 therein above the fluid level, the tubular body being preferably turned up as at 7, in which elevated portion the vent 6 is located. Closing the body of the reservoir 5 is a stopper 8 through which the discharge end of the conduit 4 extends to a point within the reservoir, and below the fluid level thereof. A portion of the conduit 4 intermediate the cell 1 and the reservoir 5 is elevated above the level of the fluid in said reservoir to prevent the fluid from flowing through said conduit into the battery cell under normal conditions.

While a reservoir of transparent material is to be desired, such material is not essential for all purposes thereof, and the reservoir might be formed of opaque material.

The cleansing fluid within the reservoir through which the gas must pass in escaping from the cell 1 may be plain water, or a chemical compound or combination, as dictated by local circumstances or conditions.

The gas generated within the cell will rise to the upper portion of the cell above the fluid line or level thereof, from which space it will be conducted through the conduit 4 and discharged below the fluid level into the reservoir 5. The gas will pass through the cleansing fluid in the form of minute bubbles and will be discharged through the vent 6 to the atmosphere. During its passage through the cleansing fluid in the reservoir 5 the gas will be washed, having the entrained corrosive matter removed or so diluted that it will be harmless as it issues from the vent 6. The cleansing fluid will further cool the gas reducing its explosive tendency, and further will provide a fire check to protect the cell 1. If the gas should be exploded at the vent 6 the cleansing fluid within the reservoir would form a body of non-inflammable material between the vent and the cell, preventing the burning gas following back through the conduit and igniting the gas within the cell or preventing the heat becoming great enough to explode the gas in the cell. The fluid in the reservoir 5 will effectually prevent the air entering the cell 1, but at the same time will offer but slight resistance to the escape of the gas from the cell. It will also serve as a check against dirt and dust. When a battery cell is charged too rapidly or over charged the violent generation of the gas will at times force a portion of the electrolyte from the cell; the overflow electrolyte thus forced from the cell will be collected within the reservoir, and when the level of the solution in the cell returns to normal, a slight vacuum will be formed, and the over flow solution will be returned to the cell 1 through the conduit 4 by section as through a siphon. When it is necessary to add water to the solution in the cell, it may be accomplished through the reservoir 5 by tipping the cell with reservoir attached so that the fluid will pass by gravity through the conduit 4 to the cell, or it may be forced through the conduit to the cell by applying air under pressure to the vent 6.

By the use of a transparent reservoir the condition of the cell as to full charge or otherwise, can be determined by the number of gas bubbles to be seen passing through the reservoir in a given interval of time. It has been determined that the proportion of bubbles is in direct ratio with the strength of charge. Thus for example it may be said that a six volt, sixty ampere battery, charging at a four ampere rate will give off one bubble per second of time.

In Fig. 3 the vent conduit 4 is shown as leading from a point of the cell 1 other than through the stopper 3. It is immaterial from what point of the cell the conduit passes except that the intake orifice of said conduit should be in the space 9 intermediate the electrolyte level and the top of the cell.

In Fig. 4 is shown a jar or reservoir 10 in which the entire cell is located, the jar being filled with cleansing fluid or water. A conduit 11 leads from the space 9 down to the bottom of the cell and discharges into the jar or reservoir 10 far below the fluid level thereof. The action of the device is exactly as before described.

In Fig. 5 is shown a reservoir 12 of reduced size on the side of the cell. A conduit 13 leads from a point above the level of the solution, within the cell to a point below the fluid level of the reservoir 12. Additional fluid may be added to the cell by filling the reservoir 12 above the level of the conduit 13 within the cell.

In both the structures of Figs. 4 and 5 the reservoir is entirely open at the top so that a special vent is not required.

In Fig. 6 is shown a cell constructed as before described, having the stopper 15. Supported on the stopper 15 is a flask 16 forming a reservoir for the cleansing fluid. A conduit 17 extends from the space 9 through the stopper 15 into the flask 16 and above the fluid level, thence turning down and discharging below the fluid level of the flask. The bend of the conduit within the flask is necessary to prevent the fluid draining under normal conditions from the flask to the cell. A vent hole is located in the flask 16 at the point 18.

In each of the constructions described the combination operates in the same manner and for the same purposes as before described.

From the above description it will be apparent that there is thus provided a device of the character described possessing the particular features of advantage before enumerated as desirable, but which obviously is susceptible of modification in its form proportion, detail construction, and arrangement of parts without departing from the principle involved or sacrificing any of its advantages.

Having thus described my invention I claim:

1. In a device of the character described, the combination with a plurality of battery cells, of a fluid containing reservoir common to all of said cells, independent vent pipes independently connecting the various cells with said reservoir each of said pipes leading from a point above the level of the fluid in the corresponding cell to a point below the fluid level of the reservoir, substantially as specified.

2. As a means of indicating the condition of a battery cell charge, the combination with a battery cell, of a transparent fluid containing reservoir, a vent pipe leading from the cell and discharging into the reservoir below the fluid level thereof whereby the escape of gas from the cell may be observed in the form of bubbles passing through the fluid within the reservoir and by the frequency of the bubbles adapted to disclose the condition of the cell charge, substantially as specified.

3. In a device of the character described, the combination with a plurality of battery cells, of a transparent reservoir containing a quantity of fluid, a plurality of independent conduits leading from the respective cells to the common reservoir and discharging therein below the fluid level within the reservoir, a portion of each of said conduits between the cell and reservoir being extended above the fluid level of the reservoir, substantially as and for the purpose specified.

4. In a device as described, the combination with an electric battery cell, of a tubular glass reservoir having a reduced upturned extremity, said upturned extremity having a vent orifice therein, a head in said reservoir, a vent conduit leading from said cell and extending through the head of said reservoir and communicating with the interior thereof, substantially as specified.

In testimony whereof, I have hereunto set my hand this 5th day of February A. D. 1908.

OSCAR D. APPLE.

Witnesses:
C. E. OEDEN,
F. L. WALKER.